United States Patent
Saes et al.

(10) Patent No.: US 9,198,239 B2
(45) Date of Patent: Nov. 24, 2015

(54) DRIVER SYSTEM FOR DRIVING AT LEAST ONE LED

(71) Applicant: EldoLAB Holding B.V., Eindhoven (NL)

(72) Inventors: Marc Saes, Eindhoven (NL); Petrus Johannes Maria Welten, Oss (NL)

(73) Assignee: EldoLAB Holding B.V., Eindhoven (NL)

( * ) Notice: Subject to any disclaimer, the term of this patent is extended or adjusted under 35 U.S.C. 154(b) by 0 days.

(21) Appl. No.: 14/361,345

(22) PCT Filed: Dec. 5, 2012

(86) PCT No.: PCT/NL2012/050853
§ 371 (c)(1),
(2) Date: May 29, 2014

(87) PCT Pub. No.: WO2013/085381
PCT Pub. Date: Jun. 13, 2013

(65) Prior Publication Data
US 2014/0333229 A1 Nov. 13, 2014

Related U.S. Application Data

(60) Provisional application No. 61/566,805, filed on Dec. 5, 2011.

(51) Int. Cl.
*H05B 37/02* (2006.01)
*H05B 33/08* (2006.01)

(52) U.S. Cl.
CPC .......... *H05B 33/0809* (2013.01); *H05B 33/083* (2013.01); *H05B 33/0812* (2013.01); *H05B 33/0815* (2013.01); *H05B 33/0845* (2013.01); *Y02B 20/343* (2013.01); *Y02B 20/345* (2013.01); *Y02B 20/347* (2013.01)

(58) Field of Classification Search
USPC ......... 315/210, 224–226, 247, 250, 291, 299, 315/306, 307, 308, 312, 360
See application file for complete search history.

(56) References Cited

U.S. PATENT DOCUMENTS

| | | | |
|---|---|---|---|
| 8,896,230 B1 * | 11/2014 | Zhang ........................... | 315/291 |
| 2007/0229001 A1 * | 10/2007 | McIntosh et al. ............. | 315/307 |
| 2008/0197826 A1 | 8/2008 | Schiff et al. | |
| 2010/0033152 A1 | 2/2010 | Chen et al. | |
| 2011/0085576 A1 | 4/2011 | Crawford et al. | |
| 2011/0121755 A1 | 5/2011 | Han | |

FOREIGN PATENT DOCUMENTS

| | | | |
|---|---|---|---|
| EP | 2315497 A1 | 4/2011 | |
| WO | 2008/110990 A1 | 9/2008 | |

* cited by examiner

*Primary Examiner* — Tung X Le
(74) *Attorney, Agent, or Firm* — Hoffmann & Baron, LLP

(57) ABSTRACT

A driver system for driving at least one LED, the driver system includes an LED driver including a current source connected to the at least one LED for providing an LED drive current to the at least one LED, and a control module for controlling a flow of the LED drive current through the at least one LED. The driver system further includes a power supply having a power output terminal connected to a power input terminal of the current source for providing an electrical power to the current source. The control module includes a control signal output connected to a control signal input of the power supply for controlling an operation of the power supply.

17 Claims, 4 Drawing Sheets

DRIVER SYSTEM FOR DRIVING AT LEAST ONE LED

CROSS-REFERENCE TO RELATED APPLICATIONS

This application is the National Stage of International Application No. PCT/NL2012/050853 filed Dec. 5, 2012, which claims the benefit of U.S. Provisional Application No. 61/566,805, filed Dec. 5, 2011, the contents of which is incorporated by reference herein.

FIELD OF THE INVENTION

The present invention relates to a driver system for driving at least one LED.

BACKGROUND OF THE INVENTION

A driver system may be applied for driving an LED assembly, the LED assembly may comprise at least one LED. It is well known for the skilled person to drive the LED assembly by means of a power supply providing for example a constant current to the at least one LED.

A prior art driver system is depicted in FIG. 1. In FIG. 1, a driver system 1 comprises a LED assembly 3, a power supply 5 and a LED driver 7. The LED assembly 3 comprises a plurality of LEDs 11. At least one set of the LEDs 11 is formed in a serial LED chain 12 in the LED assembly 3. The LED driver 7 comprises an (e.g. switched mode) current source 8 and a plurality of switches 9. At least one set of the switches 9 is formed in a serial switches chain 10 whereby a parallel switch is provided for each respective LED or LED group. The power supply 5 in this example comprises a fly-back converter 13 and a power factor correction circuit 15.

The power supply 5 is with an input thereof connected to an alternating current (AC) source 14 and is with an output thereof connected to the LED driver 7. The LED driver 7 is with an input connected to the power supply 5 and is with an output connected to the LED assembly 3. At least one of the switches 9 in the LED driver 7 is connected to one of the LEDs 11 or a group of LEDs in the LED assembly 3.

The power supply 5 receives an alternating current (AC) from the AC source 14. The fly-back converter 13 is arranged to convert a (rectified) mains voltage of the power supply 5 into a constant voltage 17 and transmit the constant voltage 17 to the LED driver 7. The power factor correction circuit 15 is arranged to improve a phase relation between the input current and the input voltage in the power supply 5 so as to improve a power factor.

The LED driver 7 receives the constant voltage 17 from the power supply 5.

The current source 8 is arranged to provide a LED drive current 19 to the LED assembly 3. The switches 9 are arranged to switch ON/OFF the LEDs 11 in the LED assembly 3.

The LEDs 11 in the LED assembly 3 are controlled by the respective parallel switches 9. Each LED of the serial LED chain 12 is activated or de-activated by opening or closing of a respective corresponding switch of the serial chain 10.

In the driver system 1, when applying a constant LED drive current, a voltage across the entire LED assembly 3 will vary substantially with the switching ON/OFF of the separate LEDs or groups of LEDs 12 by the switches 10. When no LEDs 12 are ON, the voltage across the entire LED system 3 will substantially drop to zero. When all LEDs 12 are ON, the voltage across the entire LED system 3 will equal the sum of the voltages of each independent LED group 12.

The abovementioned driver system 1 comprising a cascading of two supplies (namely the, e.g. switched mode, power supply and the, e.g. switched mode, current supply that drives the LEDs) may exhibit shortcomings in its dynamic behavior when driving LED assembly 3.

It is desirable to provide an improved driver system.

SUMMARY OF THE INVENTION

The present invention provides a driver system for driving at least one LED, the driver system comprising an LED driver comprising a current source connected to the at least one LED for providing an LED drive current to the at least one LED, and a control module for controlling a flow of the LED drive current through the at least one LED; a power supply having a power output terminal connected to a power input terminal of the current source for providing electrical power to the current source; wherein the control module comprises a control signal output connected to a control signal input of the power supply for controlling an operation of the power supply.

Here, the current source and the power supply may be any type of power supply, such as a switched mode power supply, e.g. of a buck-boost type or a boost-buck type or, more specifically, the fly-back type switched mode power supply. The current source and/or power supply may also be of a linear type, e.g. a regulated linear power supply.

The LED assembly may comprise any type of LEDs, such as high power illumination type LEDs, more specifically the LED assembly may comprise a group of LEDs having a same color, e.g. white light LEDs, or may contain LEDs having different colors. The LED driver may contain one or more switches (e.g. serial and/or parallel to the respective LED) that enable to switch on or off the respective LED associated with the particular switch. The switches may comprise a (e.g. semiconductor) switch, a switchable current source, a controllable impedance, etc. Alternatively, a value of the LED drive current may be varied, e.g. by means of setting different LED drive current levels or by pulsing the current using e.g. duty cycle modulation, pulse width modulation, etc. Still further, multiple current sources may be applied, such as a current source for each group of LEDs (e.g. each group of LEDs to emit its own color). The driver may provide a constant LED drive current (possibly in combination with switches that enable a selective switching of LEDs, thereby enabling for example a pulse width modulation) or may provide an LED drive current whose value may change over time, e.g. allowing a modulation of the effective LED light output by e.g. pulse width modulation of the LED drive current.

The control module may comprise any type of control, comprising e.g. digital control by means of a microprocessor, microcontroller, a programmable digital device, and/or other digital control electronics. Furthermore, or instead thereof, the control module may comprise analogue electronics, such as comparator(s), filter(s), pulse width control circuits, timer circuits etc. The control module may comprise a switches array comprising paralleled switches series or serial switches or any combination thereof. The control module may control a flow of the LED drive current through the at least one LED by means of a control of a magnitude of the LED drive current and or activation/de-activation of one or more of the LEDs. The control of the magnitude of the LED drive current may be performed by a pulse modulation (e.g. pulse width modulation, pulse frequency modulation, etc) of the LED drive current. The activation/de-activation of one or more of the LEDs may e.g. be performed by means of a pulse modulation, such as a pulse width modulation of switches associated with the LEDs (e.g. switches, switchable current sources or variable impedances parallel to the or each LED, switches, switchable voltage sources or variable impedances in series with the or each LED). The control signal may be provided by the control module to the power supply and may contain any type of control signal, such as an analogue control signal, a digital parallel or serial bus control signal, etc, and may for example contain a desired value of one or more parameters for the power supply. When the control signal is received by the power supply, the power supply may adapt its operation accordingly (examples of which will be provided below) so as to enable the cascading of the power supply and the current source to exhibit a more adequate dynamic behavior. The control module hence controls the driving of the at least one LED as well as—by means of the control signal—at least part of an operation of the power supply. The controlling the driving of the at least one LED by the control module may comprise controlling of the current source, controlling the switches, and/or controlling a load balancing between multiple current sources, learning by measuring long time statistics of the characteristics of the control loop and controlled quantities, so as to characterize components in a cascade that forms the control loop, including e.g. an estimate of the impedance of the mains supply, etc. A behavior of the cascaded power supplies may be improved. As an example, the power supply may establish a dynamic characteristic thereof in response to the control signal. The power supply may for example set its control loop bandwidth, its switching frequency, and/or its output voltage or output current in dependency of the control signal. Many effects may occur. For example, in case of a change in the load formed by the LEDs (for example a dynamic change in LED output power), the control module may by means of the control signal control the power supply so as to quickly adapt to the changed load condition. Thereby, when a transition in load is foreseen, the control bandwidth of the power supply may be increased. As another example, in load situations where a good power factor is of importance, for example at high power, a dynamic characteristic (e.g. a control loop bandwidth) of the power supply may be controlled via the control signal so as to optimize a power factor (for example by reducing a control loop bandwidth of the power supply so as to make the supply behave more like a resistive load, thereby improving a power factor), while at lower output power, other criteria such as a fast response, may take precedence, thereby for example sacrificing a (level of a) power factor to some extent in favor of other criteria.

In an embodiment of the present invention, the control module is arranged to estimate a load of the current source, and provide the control signal to the power supply based on the estimated load of the current source.

Based on the estimated load of the current source, the control module transmits a respective signal to the power supply to change a behavior thereof, for example a control loop bandwidth, switching frequency, output voltage, etc thereof so as to take account of the estimated load (e.g. enabling to taking account of a change in the load, a level of the load etc.). Thereby, dynamic changes in the load may for example establish a faster response of the power supply so as to more adequately (hence accurately) react to the change in load, hence allowing for example a faster settling time, resulting in an improved, e.g. more stable input to the current source, hence enabling the current source to more accurately comply to a desired dynamic change in light output.

Likewise, as explained above, the estimated load may be applied by the control module to control the power supply (by means of the control signal) for a high power factor in case a high load has been estimated and for example to control the power supply for a fast response otherwise, to prevent a hick-up mode, allow fast response to load changes, etc.

In an embodiment of the present invention, the control module is arranged to estimate the load of the current source from setpoint input data provided to the control module at a setpoint input thereof. The setpoint input data may represent a desired intensity, color, etc of the LEDs. The setpoint input may be a digital (e.g. bus) interface or an analogue input for correspondingly receiving digital or analogue setpoint data. The setpoint data (i.e. setpoint input data) may indicate e.g. the desired intensity or average light characteristics of the at least one of the LEDs of the LED assembly. Since the control module may arrange for the driving of at least one of LEDs 111 in the LED assembly based on setpoint data, the estimation of the load of the current source can be adequately determined from setpoint data. The estimation of the load may also be performed using (known) characteristics of the driver and LED assembly. These can be (partially) known by design or by means of a predetermined configuration data, such as a LED code. These characteristics may f.e. describe time characteristics such as a delay or aspects of the control behavior (overshoot, undershoot, etc.) of the current supply that may influence the load as "seen" by the voltage supply. Furthermore, setpoint data may be provided in the form of a sequence of setpoint values, allowing the control module to anticipate a desired light output level, hence a desired load.

In an embodiment of the present invention, the control module is arranged to estimate the load of the current source from a forward voltage over the at least one LED.

Here, the forward voltage may refer to the voltage across the entire LED assembly. The forward voltage over the LEDs (at a given, e.g. known or constant current) may provide an adequate measure for the load, as the total power may be adequately determined from the forward voltage and the LED drive current. This feature may be applied in case of a switching of the LEDs by means of respective switches associated with respective ones of the LEDs, as well as in case such switches are omitted and for example a pulsation of the LED drive current is applied.

In an embodiment of the present invention, the control module is arranged to anticipate a load change of the current source and to control the power supply in accordance with the anticipated load change.

Setpoint data may be provided in the form of a sequence of setpoint values, allowing the control module to anticipate a desired light output level, hence a desired load. Anticipation may for example be performed in the following causal way. A delay may occur for at least one of the following causes: From a moment when the control module receives a setpoint, successive actions take place that require some time before an effect of the new setpoint is substantially noticeable at the load (i.e. the LED's). Such actions include: Converting the setpoint to a drive signal for the FET or other switch of the driver current source. A response time of a level shifter in a gate of the FET, the FET itself, a coil that forms the inductance, an output capacitance, and the LEDs. It may be the case that the actual output of the driver is based on a previous setpoint value in order to enable an interpolation from the previous to the present setpoint. The interpolation provides more time to drive the power supply in order to anticipate a setpoint change. Also, such interpolation enables the power supply to more effectively control any (e.g. transient effects) as the effect is spread out in time as a result of the interpolation. A delay by one or more of the above causes may enable the control module to determine an effect on the power supply and provide a control signal (e.g. a sequence of control signal values) to the power supply in order to at least partly compensate for an effect of the (changed) setpoint on the power supply. Correspondingly, in an embodiment, the control module is arranged to anticipate the load change of the current source by determining the control signal to control the power supply during a delay between a providing of the setpoint input data to the control module and the load change resulting from the setpoint data. During the time between the providing of the setpoint (the delay due to one or more of the above causes) and the effect of the setpoint of an output of the driver, the control signal for controlling the power supply is generated, and the power supply is driven accordingly, so that dynamic effects may be anticipated and/or at least partly compensated by a corresponding control of the power supply. Based on the anticipated load change of the current source, the control module may transmit the control signal to the power supply to take account of the anticipated load, e.g. changing the e.g. output voltage thereof, changing a bandwidth thereof, changing a switching frequency thereof, etc. so as to at least partly compensate for a fluctuation due to the change of the load.

In an embodiment of the present invention, the control module is arranged to anticipate a power supply output ripple and to control the power supply in accordance with the anticipated power supply output ripple.

The power supply output ripple may be a repetitive effect. The control module may anticipate such repeating effect, and may transmit the control signal to the power supply to at least partly compensate for the anticipated load change, such as the ripple. Thereby, for example an output voltage setpoint of the power supply may be changed repetitively in order to at least partly compensate the ripple.

In an embodiment of the present invention, the power supply is arranged to set a control loop bandwidth of the power supply in response to a value of the control signal.

As explained above, the change of the control loop bandwidth of the power supply may be applied to set a dynamic behavior of the power supply as desired.

The control loop bandwidth may for example be set by activation of a filter, switching of a compensation network, or any other suitable means.

In an embodiment of the present invention, the control module is arranged to increase the control loop bandwidth of the power supply during a change of the load of the current source.

As explained above, this may render the power supply to quickly react to the load change and consequently may allow to have the LEDs respond more accurately to a desired change, such as a change in intensity, color, etc.

In an embodiment of the present invention, the control module is arranged to increase the control loop bandwidth of the power supply in dependency of a magnitude of the load of the current source. In a preferred embodiment, the control loop bandwidth is increased when the load is decreased and vice versa. As explained above, at a high load of the current source, the power factor may play a more dominant role, the power factor may be improved by a decrease of the control loop bandwidth of the power supply. At a low load, other requirements (fast response, preventing hick-up behavior at low load conditions, etc) may require a higher control loop bandwidth, possibly at a cost of a lower power factor, which may be more acceptable at a lower load level. Hence, a higher performance may be achieved possibly omitting additional elements that would be required otherwise, such as a filter or additional converter stage to improve power factor, etc.

In an embodiment of the present invention, the power supply is arranged to set a switching frequency of the power supply in response to a value of the control signal.

Here, the change of the switching frequency of the power supply may have an effect on a maximum output power, a dynamic behavior (e.g., bandwidth), a response time, a settling time, etc. of the power supply.

In particular, a combination of the above feature of the control loop bandwidth being increased when the load is decreased and vice versa, in combination with the feature of the control loop bandwidth being increased during a change of the load of the current source has proven to be effective: A high power factor (e.g. a higher power factor than could conventionally be obtained in a single stage power supply) may be obtained thereby at a high load (i.e. when a high power consumption is drawn from the mains supply), while a fast dynamic response and accuracy may be improved during transitions in power level as well as at lower load conditions where a high power factor is of less importance.

In general, the control signal provided by the control module to the power supply may have an effect on one or more of the following parameters of the power supply, such as but not being limited to: an output voltage setting, an output power setting, a bandwidth, a control loop frequency, proportional (P), integrating (I) and/or differentiating (D) factors, a damping, a control strategy/structure itself (i.e. from linear to non-linear or from non-cascaded to cascaded control, etc. Furthermore, the control signal provided by the control module to the power supply may have an effect on a feed forward gain factor of the power supply, whereby an anticipated load may become a feed-forward signal when fed-back but ahead of reality due to anticipation.

BRIEF DESCRIPTION OF THE DRAWINGS

The invention will be explained in more detail with reference to the appended drawings that are only intended to show embodiments of the invention and not to limit the scope of the invention. The scope of the invention is defined in the annexed claims and by its technical equivalents.

The drawings show.

DETAILED DESCRIPTION OF THE INVENTION

Figure 1:
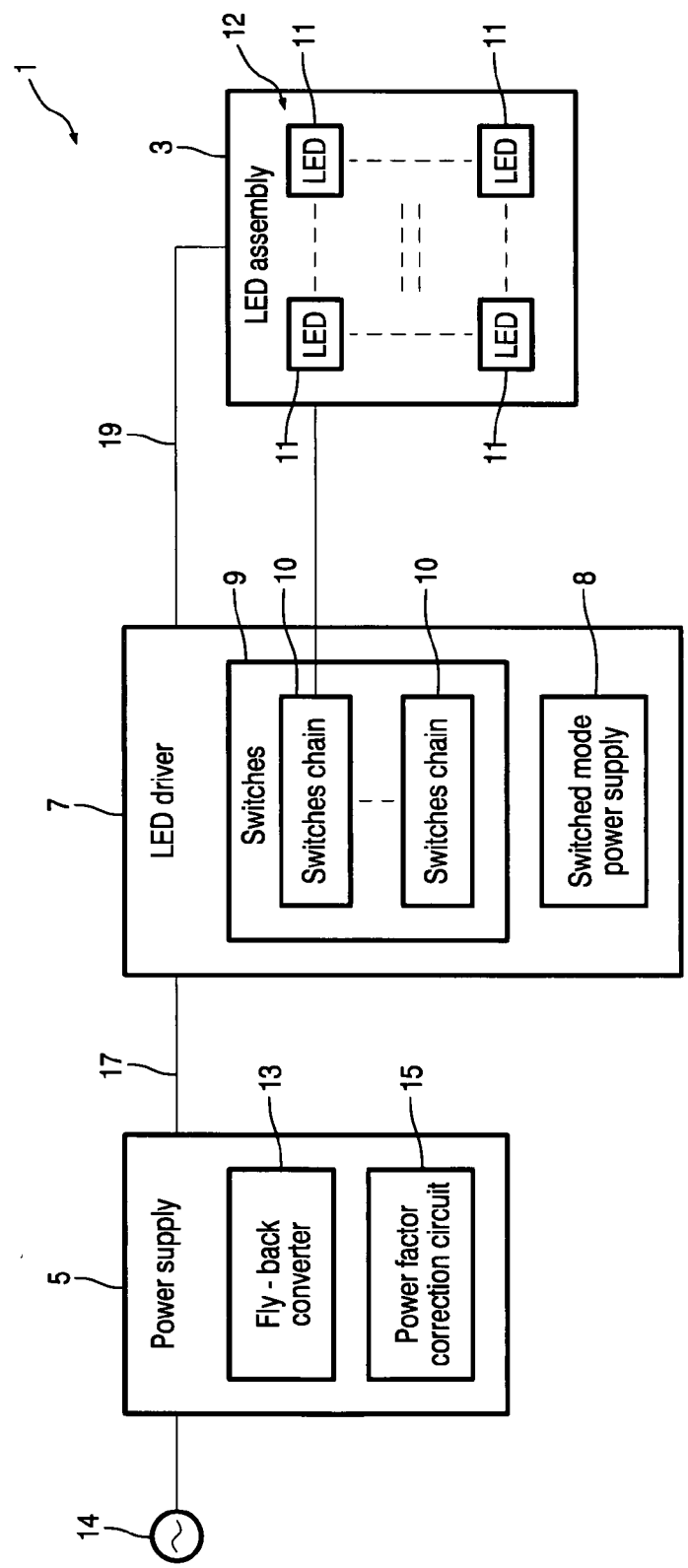
FIG. 1 shows a schematic view of a prior art driver system.
Figure 2:
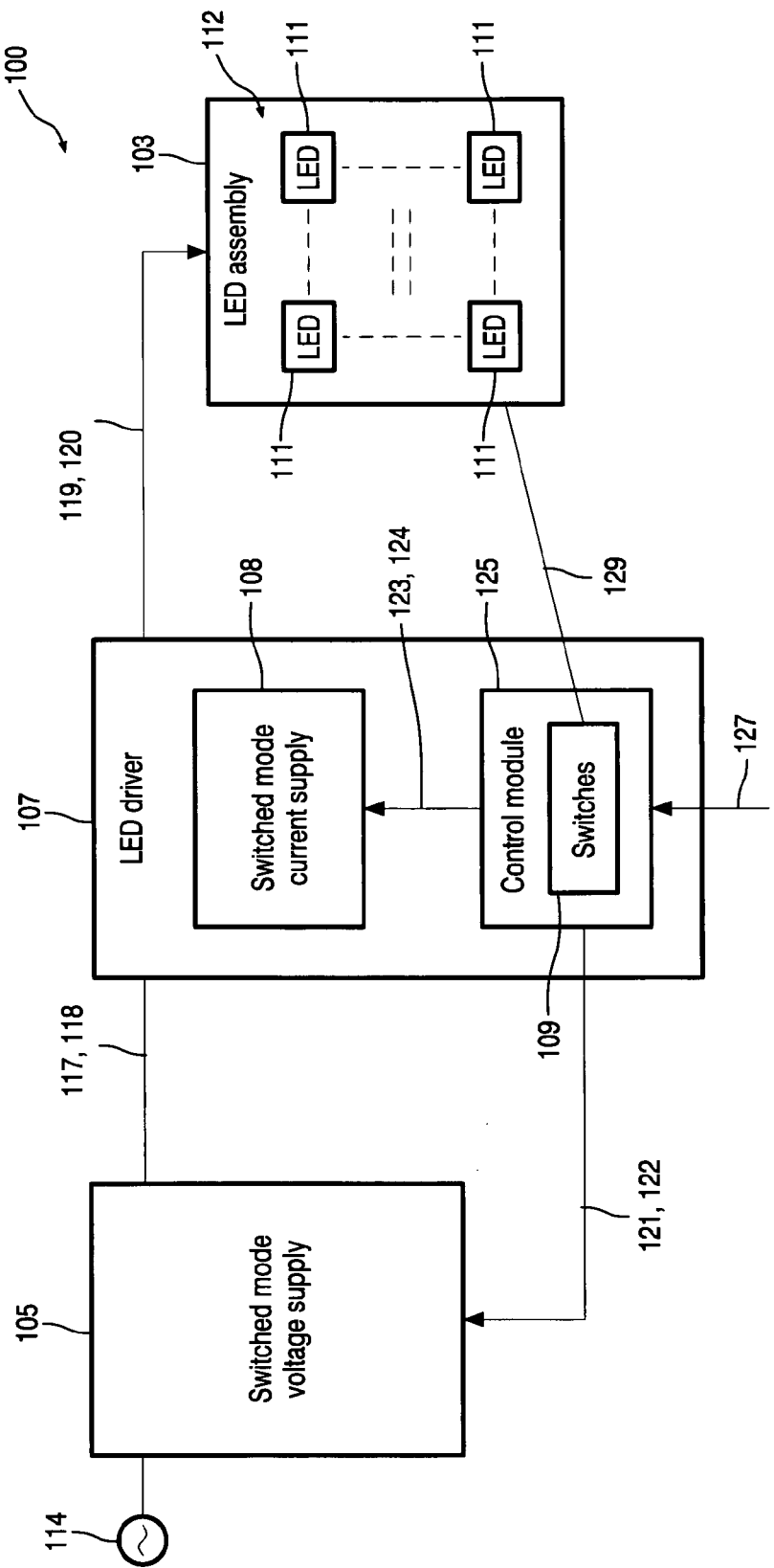
FIG. 2 shows a schematic view of a driver system according to one embodiment of present invention.

In FIG. 2, a driver system 100 comprises a LED assembly 103, a power supply 105 and a LED driver 107. The LED assembly 103 comprises a plurality of LEDs 111. At least one group of the LEDs 111 is formed in a serial LED chain 112 in the LED assembly 103. The LED driver 107 comprises a current source 108 and a control module 125.

The control module 125 comprises a setpoint input 127 arranged to receive setpoint data.

In one embodiment, the control module 125 further comprises a plurality of switches 109, e.g. ion parallel to each LED or group of LEDs, the switches may be used to selectively activate/de-activate the LED or group of LEDs to which the respective switch is connected in parallel. Alternatively, the switches 109 may be omitted. The LED drive current supplied by the current source may then be controlled so as to switch on the light, to switch off the light and to dim the light (eg. by reducing or pulsing the LED drive current).

In one embodiment, the power supply 105 is a fly-back type power supply.

The power supply 105 is with an input thereof connected to an alternating current (AC) source 114, such as a mains supply voltage, and is with an output thereof (such as a regulated voltage output) connected to the LED driver 107 via a link 117. The LED driver 107 is with an input thereof connected to the power supply 105 via the link 117 and is with an output thereof (such as an LED drive current output) connected to the LED assembly 103 via a link 119. The control module 125 is connected to at least one of the LEDs 111 in the LED assembly 103. The control module 125 is with a control signal output thereof connected to a control signal input of the switching voltage supply 105 via a link 121. The control module 125 is in this embodiment with an output thereof connected to the current source 108 via a link 123 in order to enable the control module to control for example a level of the LED drive current.

In one embodiment, at least one of the switches 109 in the control module 125 is connected to one of the LEDs 111 in the LED assembly 103 via a link 129.

[Function]

The power supply 105 receives an (e.g. rectified) alternating current (AC) from the AC source 114 and provides a voltage 118 to the LED driver 107 via the link 117.

The power supply 105 receives a control signal 121 from the control module 125 via the link 121.

In one embodiment, the voltage 118 provided by the power supply 105 is a constant voltage. In another embodiment, the power supply provides a constant current and in yet another embodiment, the power supply provides a constant power and in yet another a magnitude of one or more of those characteristics may be on demand.

The LED driver 107 receives the voltage 118 provided by the power supply 105. The current source 108 in the LED driver 107 provides a LED drive current 120 to the LED assembly 108 via the link 119. The current source 108 receives a second control signal 124 from the control module 125 via the link 123.

In one embodiment, the LED drive current 120 provided by the current source 108 is a constant current.

The control module 125 provides the first control signal 122 to the power supply 105 via the link 121. The setpoint input 127 of the control module 125 receives setpoint data. The setpoint input 127 may be a digital input, a bus interface or an analogue input for receiving setpoint data. The setpoint data may provide an indication of a operation of the at least one of the LEDs of the LED assembly 103, e.g. the desired intensity or average light characteristics of the at least one of the LEDs of the LED assembly 103. The control module 125 controls the current source and switches ON/OFF the at least one of LEDs 111 in the LED assembly 103 based on setpoint data.

In one embodiment, at least one of the switches 109 in the control module 125 switches ON/OFF the at least one of the LEDs 111 in the LED assembly 103.

In one embodiment, the control module 125 provides the second control signal 124 to the current source 108.

In one embodiment, the control module 125 estimates a load of the current source 108 in the LED driver 107. The forward voltage over the LEDs (at a given, e.g. known, constant or switched current) may provide an adequate measure for the load, as the total power may be adequately determined from the forward voltage and the LED drive current It is noted that the forward voltage Vf may itself be the characteristic of the load that the control signal 122 is based on. For example when the forward voltage Vf is just 4V (only 1 LED switched ON), then it is wise for efficiency reasons to only require 4V+1 or 2 V=5 to 6 V from the front-end. It is thus noted that under the term load, not only power dissipation or current should be understood. All characteristics of load (voltage, current, power, delay, . . . ) may hence be used to determine the first control signal on.

A disturbance may be formed by a dip or peak at the output of the power supply at 117 due to a load change. Such a dip or peak could be anticipated, enabling to alter (e.g. heighten or lower) on beforehand the voltage supply in order to at least partially compensate for the dip or peak caused by the change in load. Due to delay effects and durations of disturbances and adjustment behaviors to load changes, the anticipation and subsequent control may lead to this type of (partial) compensation.

Furthermore, disturbances such as a ripple may at least partly be compensated. Such undesired disturbances may subsequently influence the LED assembly 103 and may deteriorate the expected result of the LED assembly 103, e.g. the intensity or the average light characteristics of the LED assembly 103. For example, an output voltage ripple of the power supply and/or an LED drive current ripple of the current source is measured by the control device (by any suitable measurement means or estimated from other measured parameters), the control module determines the control signal to at least partly compensate the disturbance: for example, a ripple may at least partly be compensated by the control module by means of the control signal affecting an output voltage input setpoint of the power supply so as to at least partly compensate such ripple.

In one embodiment, the estimation of the load of the current source 108 may be based on a forward voltage over the at least one LED 111 of the LED assembly 103. Here, the forward voltage indicates the voltage across the entire LED assembly 103. It is noted that some configurations may comprise multiple current sources loading a same power supply. In that case the power supply should be adequate for the multiple current sources typically causing it to be less than optimal for most individual current supplies.

In one alternative embodiment, the estimation of the load of the current source 108 may be based on set point input data at the set point input 127. Note that the set point data from the set point input 127 may be available before providing the LED drive current to the LED assembly 103.

Based on the estimated load of the current source 108, the control module 125 can provide the first control signal 122 to the power supply 105 via the link 121 to control one or more parameters thereof. The first control signal 122 may represent or contain in any form the desired value of the parameters for the power supply 105. When the first control signal 122 is received by the power supply 105, the voltage 118 provided from the power supply 105 to the LED driver 107 is changed in response to the changes of the parameters of the power supply 105.

The abovementioned parameters may for example be (further alternatives having been mentioned above):
  a parameter indicating the control loop frequency of the power supply 105, and/or
  one or more parameters indicating the transfer characters of the power supply 105, and/or
  a parameter indicating whether the power supply 105 is in a hick-up mode (or other mode) or not.

The estimation result of the load of the current source 108 can be classified into four categories:
1) the load of the current source 108 is a high value;
2) the load of the current source 108 is a low value;
3) the load of the current source 108 is decreasing;
4) the load of the current source 108 is increasing.

It is to be understood that the load may be understand so as to be characterized by one or more of its power, its resistance, its impedance, its voltage, its current, its sequential behavior, or any other characteristic or combinations of the mentioned characteristics.

For the first situation, the control module 125 transmits the control signal 122 to the power supply 105 in order to:
  decrease the control loop frequency of the power supply 105 so as to decrease the bandwidth of the power supply 105, and/or
  change the transfer characters of the power supply 105 so as to decrease the bandwidth thereof.

Consequently, the power factor of the power supply 105 may be improved due to the changing of the bandwidth of the power supply 105 from a relatively high value to a relatively low value.

For the second situation, the control module 125 transmits the control signal 122 to the power supply 105 in order to:
  increase the control loop frequency of the power supply 105 so as to increase the bandwidth of the power supply 105, and/or
  change the transfer characters of the power supply 105 so as to increase the bandwidth thereof, and/or
  switch off the hick-up mode of the power supply 105.

Consequently, the hick-up current of the power supply 105 is minimized due to the changing of the bandwidth of the power supply 105 from a relatively low value to a relatively high value and/or switching off the hick-up mode thereof.

For the third situation, the control module 125 transmits the control signal 122 to the power supply 105 in the following sequences:
  i) the control module 125 anticipates or detects a change of the load of the current source 108 from a high value to a low value;
  ii) the control module 125 increases the bandwidth or maintains the bandwidth of the power supply 105 at a high level during the transitional period of the change of the load, e.g. the control module 125 does not transmit any signals to the power supply 105 during the transitional period;
  iii) the control module 125 transmits the control signal 122 to power supply 105 for decreasing the bandwidth of the power supply 105 after the aforementioned transitional period.

Consequently, the fluctuation due to the change of the load of the current source 108 can be reduced. It also renders the power supply 105 to quickly react the load changes.

For the fourth situation, the control module 125 transmits the control signal 122 to the power supply 105 in the following sequences:
  i) the control module 125 anticipates or detects a change of the load of the current source 108 from a low value to a high value;
  ii) the control module 125 transmits the control signal 122 to the power supply 105 for increasing the bandwidth of the power supply 105 before the transitional period of the change of the load. The control module could also (further) increase the output voltage and lower it again after the change.

Consequently, the fluctuation due to the change of the load of the current source 108 can be reduced. It also renders the power supply 105 to quickly react the load changes.

Note that the anticipation may be based on the predefined setpoint data that will be transferred to the setpoint input 127 of the control module 125.

In the third and fourth situations, the control module 125 may also be adapted to detect or anticipate a power supply output ripple from the power supply 105. Here, the power supply output ripple is a repeating effect. Based on this anticipated repeating effect, the control module transmits a respective signal to the power supply to change the power output (e.g. output voltage) thereof so as to compensate the load change It is understood by the skilled person to change the bandwidth of the power supply 105 in a different way other than changing the control loop frequency or transfer characters of the power supply 105.

Figures 3A, 3B, 3C, 3D, 3E, 3F:
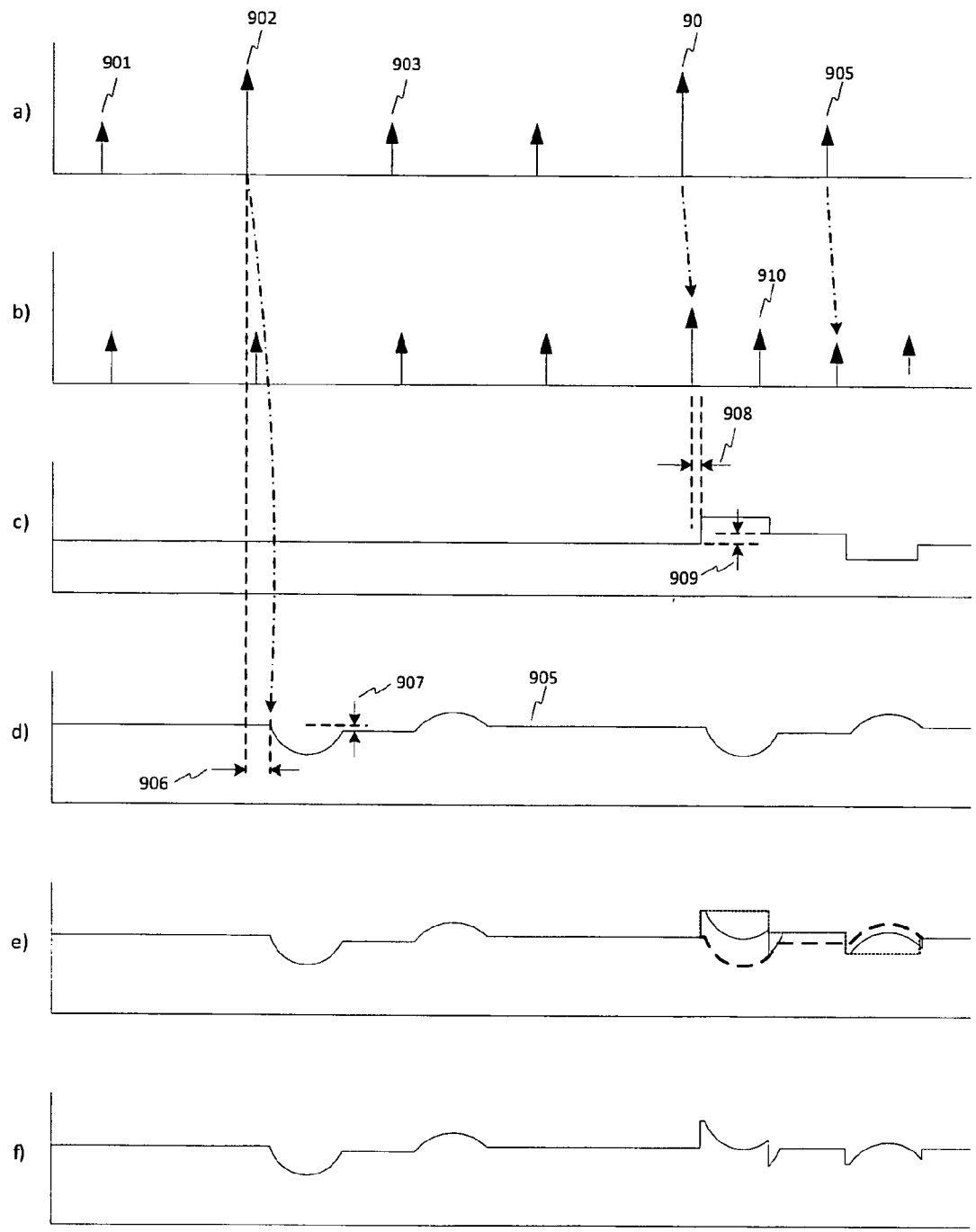
FIGS. 3a-3f each depict a time diagram of a respective signal in the driver system in accordance with an embodiment of the invention.

FIG. 3a)-3f) depict the following signals versus time:
a) received set-points
b) control signal to power supply
c) theoretical power supply output
d) LED current in case of no power supply control (not even at events 904 nor 905)
e) Combined graph (normalized to resulting LED current), with signal c) [dotted] and d) [dashed] and their average [solid] which represents the resulting LED current.
F) resulting LED current (equal to average signal in e), now drawn separately)

Reverting to FIG. 3a, assume a steady state at event 901, where a set-point is received that does not deviate from many previously received set-points.

At event 902 a larger set-point is received, causing the driver to send a higher LED current through the LEDs. After a delay 906 (FIG. 3d) this causes a dip in the voltage supply. After the power supply has recovered, a steady state offset from the previous steady state occurs with magnitude 907 (FIG. 3d).

At event 903 the previous set-point is received again causing a temporary rise in the power supply voltage and after that a return to the original steady state voltage.

Events 904 and 905 repeat the above scenario, but this time with control of the power supply through the control signal shown in FIG. 3b). At event 904, besides the control of the LED current, the control module also increases the control signal to the power supply to cause a compensating increase of the supply voltage as shown in FIG. 3c). The waveform shown is a theoretical step-response of which only the delay 908 is explicitly shown. In practice the waveform will be less rectangular and the amplitude will not be exactly as designed.

At event 910, the power supply is controlled to no longer compensate for the dip caused by the higher load, but to do compensate for the static effect of the higher load which would have caused a lower voltage at a magnitude of 907 would said compensation not be applied. This compensation causes the power supply to generate a voltage that is higher by magnitude 909 with respect to the original steady state voltage at 901.

At event 905 the reverse takes place.

The effect on the LED current from the thus controlled power supply voltage is shown in FIG. 9e as a dotted line. The effect of the set-points on the LED current without compensating via the power supply is shown in FIG. 9d. In FIG. 9e it is shown that the waveform from 9d (dotted in 9e) is compensated for by the waveform from FIG. 9c (dashed in FIG. 9e) to average to a substantially unchanged resulting LED current (solid in FIG. 9e). By dimensioning during design, calibrating/adjusting during production or installation and measuring/learning from the system during operation, the deviations caused by delays and amplitude deviations can be minimized.

Figures 4A, 4B, 4C, 4D, 4E, 4F:
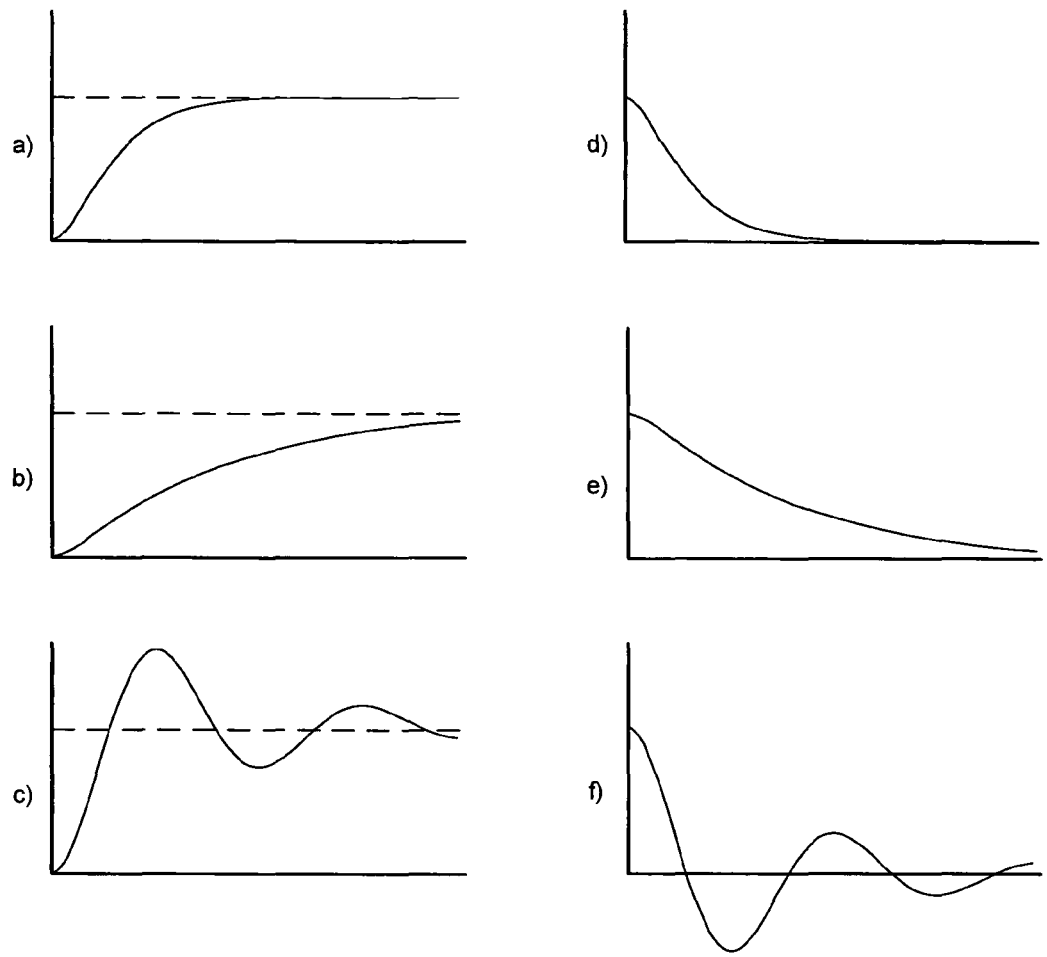
FIGS. 4a-4f each depict a time diagram of a respective signal in the driver system in accordance with embodiments of the invention.

In FIGS. 4a-f, as a basic example of influencing the control behaviour of a second order linear control in the power supply, 3 examples are shown of a simple PID control. The FIGS. 4a, 4b, 4c show the actual controlled value versus the target value set at the start of the horizontal axis, the FIGS. 4d, 4e, 4f show the resulting error. In FIG. 4a, critical damping is achieved by proper tuning of the P, I and D factors depending on, amongst others, the time constants of the controlled system. In FIG. 4b a PID setting is used delivering undershoot while in FIG. 4c a setting is used delivering overshoot.

The settings used in FIG. 4c achieve a faster response to the change in set-point than in FIG. 4a or 4b. This can be used to advantage in case a large load change is expected. By switching to the settings used in FIG. 4c just prior to the load change, will make the power supply react faster to the load change possibly at the expense of visible light effects at the output of the lighting system or a worse power factor at the input of the lighting system.

Using other control structures, such as cascaded control systems, employing techniques such as feed-forward, integrators at certain frequencies, prediction, adaption, etcetera, many of them made possible through digital control, enriches the ways in which to influence the control behaviour of the power supply from the control module.

Note that in an embodiment (where for example the cascaded power supply and LED driver are designed in an integrated fashion) the set-point for the desired light characteristics can also be fed directly to the power supply. In such embodiment, the control signal provided to the power supply may comprise the setpoint that represents a desired LED light intensity. The power-supply may then exhibit the desired behaviour for compensating load changes by control actions taken by its own internal controller. This controller may need to have knowledge of the LED driver and possibly of its load to perform optimally. Such knowledge can among others be fed to this controller by design, based on a model of LED driver and/or load, calibration, measuring/learning.

The invention claimed is:

1. A driver system for driving at least one LED, the driver system comprising:
a LED driver comprising a current source connected to the at least one LED for providing an LED drive current to the at least one LED, and a control module for controlling a flow of the LED drive current through the at least one LED; and
a power supply having a power output terminal connected to a power input terminal of the current source for providing electrical power to the current source;
wherein the control module comprises a control signal output connected to a control signal input of the power supply for controlling an operation of the power supply, and
wherein the control module is arranged to anticipate a load change of the current source by determining the control signal to control the power supply during a delay between a providing of the setpoint input data to the control module and the load change resulting from the setpoint data.

2. The driver system according to claim 1, wherein the control module is arranged to
estimate a load of the current source, and
provide the control signal to the power supply based on the estimated load of the current source.

3. The driver system according to claim 2, wherein the control module in arranged to estimate the load of the current source from setpoint input data provided to the control module at a setpoint input thereof.

4. The driver system according to claim 2, wherein the control module is arranged to estimate or measure the load of the current source from a forward voltage over the at least one LED.

5. The driver system according to claim 2, wherein the control module is arranged to anticipate the load change of the current source and to control the power supply in accordance with the anticipated load change.

6. The driver system according to claim 2, wherein the control module is arranged to anticipate a power supply output ripple and to control the power supply in accordance with the anticipated power supply output ripple.

7. The driver system according to claim 1, wherein the power supply is arranged to set a control loop bandwidth of the power supply in response to a value of the control signal.

8. The driver system according to claim 7, wherein the control module is arranged to increase the control loop bandwidth of the power supply during a change of the load of the current source.

9. The diver system according to claim 7, wherein the control module is arranged to increase the control loop bandwidth of the power supply in dependency of a magnitude of the total load of the current source.

10. The driver system according to claim 9, wherein the control module is arranged to increase the control loop bandwidth in response to the load being decreased.

11. The driver system according to claim 1, wherein the power supply is arranged to set a switching frequency of the power supply in response to a value of the control signal.

12. The driver system according to claim 1, wherein the power supply is arranged to set a control loop damping of the power supply in response to the value of the control signal.

13. The driver system according to claim 1, wherein the power supply is arranged to set an output set-point of the power supply in response to the value of the control signal.

14. The driver system according to claim 1, wherein the power supply is arranged to set at least one of a proportional, integrating, differentiating factor of the power supply in response to the value of the control signal.

15. The driver system according to claim 1, wherein the power supply is arranged to set a structure of the power supply from non-cascaded to cascaded control in response to the value of the control signal.

16. The driver system according to claim 1, wherein the power supply is arranged to set a control strategy of the power supply from non-linear to linear in response to the value of the control signal.

17. The driver system according to claim 1, wherein the power supply is arranged to set a feed forward gain factor of the power supply in response to the value of the control signal.

* * * * *